Jan. 29, 1957
A. W. REIS
2,779,838
ABSOLUTE PRESSURE SWITCH
Filed Nov. 27, 1951
2 Sheets-Sheet 1
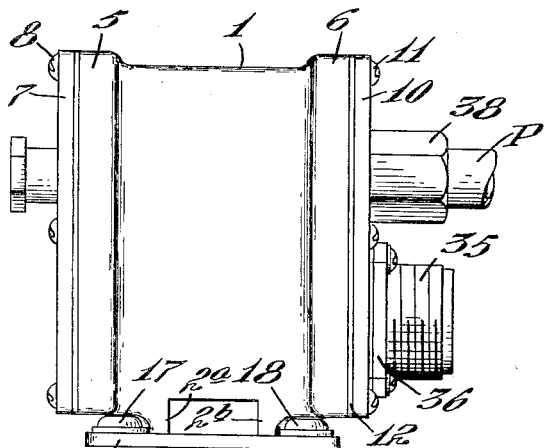
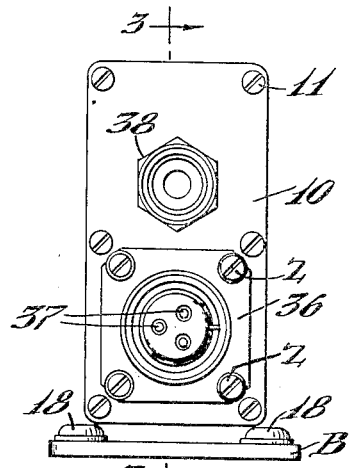
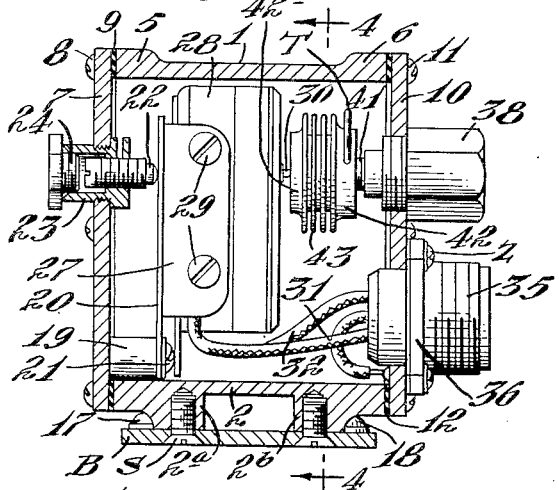
Inventor
Arthur W. Reis
by Roberts Cushman Grover
att'ys Jan. 29, 1957  A. W. REIS  2,779,838
ABSOLUTE PRESSURE SWITCH
Filed Nov. 27, 1951  2 Sheets-Sheet 2

Inventor
Arthur W. Reis
by Robert Cushman Grover
Att'ys.

United States Patent Office 2,779,838
Patented Jan. 29, 1957

2,779,838

ABSOLUTE PRESSURE SWITCH

Arthur W. Reis, Hingham, Mass., assignor to United Electric Controls Company, Watertown, Mass., a corporation of Massachusetts Application November 27, 1951, Serial No. 258,469

7 Claims. (Cl. 200—83)

This invention pertains to electrical switches, more especially to a pressure-operated switch of the absolute pressure type such as is employed, for example, for automatically controlling a pressurizing motor (for instance, an electrical air compressor) designed to maintain a predetermined pressure in the cabin of an airplane or in a chamber housing electronic equipment, the present application being a continuation-in-part of my copending application Serial No. 204,567, filed January 5, 1951, now abandoned.

For reliable use, such a switch must meet most exacting requirements since its accuracy and dependability may spell the difference between safety and disaster. Obviously, in common with other accessory equipment for airplane use, it must be of the smallest weight and external dimensions compatible with other requirements essential to accuracy and dependability. Thus, for example, it has been suggested that, for aeronautical use, such a switch should not weigh more than one pound nor substantially exceed 3" x 3¾" x 3¾" in external dimensions. It must not be affected as to sensitivity or error in operation by widely varying altitude, temperature or humidity conditions, nor must its operation be affected by exposure to high frequency vibration. Its constituent parts must be so designed that they will not work loose in service; it must be strong and rugged enough to sustain, without permanent damage, blows or shocks to which it may ordinarily be subjected during transportation or service. The interior of the case of the instrument must be readily accessible for repair and inspection of the operative parts but, in use, must be sealed against the entry of air to an extent greater than a permissive leak rate per hour up to ¼" of mercury under a vacuum of 15" of mercury or a pressure of 10" of mercury; the switch itself must be adjustable to respond to different pressures within a substantial range, for example, from 24" to 32" of mercury, absolute, under ambient pressure conditions of the order of from a vacuum of 15" of mercury to a pressure of 10" of mercury and under temperature conditions of from —80° F. to +160° F.; the switch-adjusting means must be accessible from outside of the case; the electrical system must be insulated from the case and the latter must be resistant to corrosion—for example, if the case be of aluminum it should be anodized—the switch must be operative in any position in which it may be mounted, and the case of the instrument must be provided with strong attaching lugs or equivalent elements; the pressure-responsive element of the instrument must be responsive within the range for which the instrument is intended without being thereby over-stressed or tending to take a permanent set within the limits of said range, and it must be capable of sustaining a heavy over-load pressure for a substantial period without change in external dimensions.

Moreover, the pressure responsive element must be responsive to varying pressures within the range in a direct or linear ratio, and of such small external dimensions that it may be housed within a case of the permissive size, together with the switch and other essential parts.

A principal object of the present invention is to provide a pressure-responsive control device of the absolute pressure type which is not adversely affected by high frequency vibrations imposed thereon.

Other objects are to provide a pressure-responsive control device of the absolute pressure type possessing all of the above desirable characteristics and which, at the same time, may be made at a reasonable cost and without requiring the employment of special or unusual tools or equipment. Other and further objects and advantages of the invention will be pointed out in the following more detailed description and by reference to the accompanying drawings wherein Fig. 1 is a side elevation of a control device embodying the present invention;

Fig. 2 is a front elevation of the device shown in Fig. 1;

Fig. 3 is a vertical section substantially on the line 3—3 of Fig. 2, with certain parts in elevation;

Fig. 4 is a transverse vertical section on the line 4—4 of Fig. 3;

Fig. 5 is a front elevation but with the front cover plate or head removed;

Fig. 6 is a fragmentary, vertical section, to larger scale, in the plane of the axis of the bellows, showing the means for supporting it;

Figure 7:
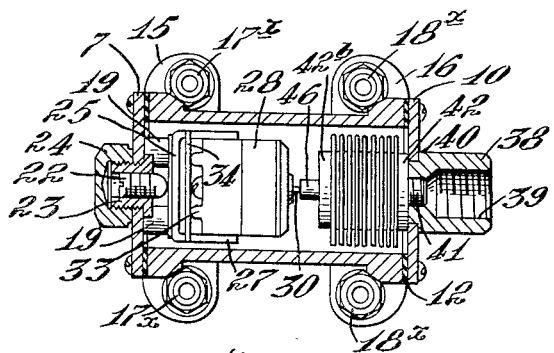
Fig. 7 is a horizontal section, through the case of the instrument, illustrating a modified construction.

Referring to the drawings (Fig. 3), the device is shown, by way of example, as comprising a casing having a hollow body portion open at both ends and of substantially rectangular transverse section comprising the top wall 1, the bottom wall 2 and the side walls 3 and 4 (Fig. 4) and provided with an air-tight closure at each end. Preferably the body portion of this casing is of integral construction, for example, a die casting of aluminum or other rigid material capable of withstanding external pressure at least equal to that of the atmosphere without substantial distortion. If the casing be of aluminum it should be anodized to resist attack by salt moist air; if of other material it must likewise be resistant to corrosion. Preferably the front and rear edges of the body portion of the case are thickened, as shown at 5 and 6, respectively, to provide for reinforcing and stiffening the case, and also to provide for the reception of the screws by means of which the front and rear heads or walls are secured to the case proper. As shown in Figs. 1 to 5, the bottom wall 2 has two horizontally spaced, downwardly directed integral ribs 2ª and 2ᵇ for the reception of attaching screws S by means of which the casing is secured to a mounting bracket B.

The rear wall or head 7, which is preferably of sheet stock, for example steel, cadmium plated, and sufficiently thick to be rigid and to withstand external pressure at least equal to that of the atmosphere, is secured to the thickened portion or flange 5 of the body portion of the case by means of screws 8 or their equivalent, with an interposed washer or gasket 9 of resilient material, preferably neoprene, designed to provide an air and water-tight seal between the head and the end surface of the body portion of the case. In the same way the front wall or head 10 is secured to the flanged portion 6 of the case by means of screws 11 with an interposed resilient gasket 12. When the heads or end closures are assembled with the case proper, the case is substantially air-tight.

As here illustrated, the attaching bracket B is a plate of rigid sheet material and has holes near its several corners for the reception of welded or driven-in plugs 17, 18 which project upwardly above the upper surface of the plate to provide added thickness, the plugs having axial bores which may be internally screw threaded (and preferably provided with permanently installed locking nuts, not shown) for the reception of bolts by means of which the bracket may be attached to the structure in which the switch is to be installed.

Because of the peculiar characteristics of the bellows employed, as hereafter described, the external dimensions of the assembled case of the switch herein disclosed may readily be made to fall within the following limits: Maximum horizontal front-to-rear distance between the outer faces of the heads 7 and 8 approximately 2⅝"; maximum horizontal distance between the extreme outer edges of the bracket B approximately 2"; maximum vertical distance between the upper edge of one of the heads and the lower surfaces of the ribs 2ª and 2ᵇ approximately 2⅞"; thus providing a casing of an internal capacity of approximately 23 cubic inches. The dimensions of the case are thus well within the permissive dimensions above suggested as desirable for aeronautical use.

Two horizontally spaced bosses 19 (Figs. 3, 7 and 8) project inwardly from the inner surface of the rear head 7 at a point just above the upper surface of the bottom wall 2, these bosses being fixedly secured leak-tight to the head or wall 7, for example, by soldering or welding. To the inner faces of these bosses there is secured the lower end of an elongate, resilient supporting tongue 20 (Fig. 3) which is attached to the bosses by means of screws 21. This tongue extends upwardly in generally parallel, spaced relation to the inner surface of the head 7 and to a point not far from the inner surface of the upper wall 1, and is so designed that it tends to bend or deflect toward the wall 7, that is to say, its upper, free end tends to move rearwardly toward the wall or head 7 when free to do so. Such movement of this spring tongue 20 is limited by an adjustable stop screw 22 (Figs. 3 and 5) which has threaded engagement with the interior of a sleeve 23 which passes through an opening in the wall 7, and which preferably has a radial flange at its inner end which engages the inner surface of wall 7 and which is permanently secured leak-tight to the wall, for example by soldering or welding. By turning the screw 22 the deflection of the spring tongue 20 may be varied. Preferably the sleeve 23 is internally screw threaded for the reception of a plug 24, which may have a head of hexagonal or other suitable shape to accommodate a wrench. Normally this plug conceals and protects the adjusting screw 22. By removal of the plug, the screw 22 becomes accessible from outside of the case for adjusting the position of the tongue 20.

Figure 8:
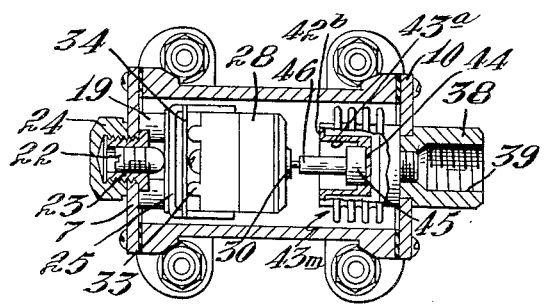
Fig. 8 is a view similar to Fig. 7, but with parts broken away, showing a further modification.

A switch holder is rigidly secured to the right-hand face of the spring tongue 20. This switch holder is a rigid, channel-shaped device comprising the rear wall 25 (Fig. 7) and spaced, parallel side walls 26 and 27 (Fig. 4). The switch holder is preferably of sheet metal, for instance, brass or aluminum, and its rear wall 25 is permanently secured to the right-hand side of the tongue 20 by rivets, welding or the like. The side walls 26 and 27 of the switch holder are spaced apart a distance to permit the outer case 28 of a switch device to be fitted snugly between them, the switch case being secured to the switch holder by screws 29 (Fig. 3) or equivalent means. The switch, whose case 28 is thus secured within the switch holder, may be of any suitable type appropriate for the purpose, but is preferably a single pole, single throw snap action switch of the kind commonly known as a "micro" or "mu" switch, having an actuating pin 30 projecting out through the right-hand side of its case, as shown in Fig. 3, and which controls the position of contacts (not shown) within the switch case, these contacts being in circuit with conductors 31 and 32. As illustrated in Figs. 7 and 8, the switch case 28 has parallel ribs 33 projecting from its left-hand face between which are located certain metallic parts projecting from the switch case, and in order to prevent contact of such metallic parts with the switch holder, a sheet 34 of suitable insulating material, for example mica or indurated fiber, is interposed between the inner surface of the rear wall 25 of the switch holder and the outer edges of the ribs 33.

A nipple member 35 is arranged within an opening in the lower part of the front wall or head 10 of the casing, this nipple preferably having a radial flange 36 which engages the outer surface of the head 10 and which is attached to the head 10 by screws Z and made leak-tight with respect to the head my an interposed gasket or by solder or welding, the flange constituting a reinforce for the head at the region of the opening. This nipple 35 is preferably externally screw threaded for connection to an electrical conduit, and is provided at its interior with an insulating base in which are embedded terminal elements to which the conduits 31 and 32 are connected. These terminal elements in turn are electrically connected to two of the pins 37 (Fig. 2) arranged within the interior of the nipple 35, the third pin being grounded to the metal of the switch case, the pins 37 being designed to enter corresponding sockets in a plug at the end of a conductor which may be inserted within the nipple 35.

Above the nipple 35 a hollow stud 38 is secured to the front wall or head 10 of the case, this stud being axially aligned with the actuating pin 30 of the switch. Thus stud 38 (Fig. 6) is hollow and is permanently secured to the head 10, for example by welding, as shown at 40. The stud 38 has an axial bore 39 which is reduced in diameter at its inner end. The inner end portion of stud 38 has a bore coaxial with but of smaller diameter than the bore 39, and within the smaller bore is secured, for example by screw threading, a short, tubular nipple 41 projecting from the base or head 42 of an aneroid type metallic bellows 43. The nipple 41 has an axial passage leading to a radial port 41ª of the order of ⅟₁₆ inch in diameter (Fig. 6). The stud 38 is preferably internally screw threaded for the reception of the end of a pressure connection P (Fig. 1) leading to the chamber wherein the air pressure is to be kept constant. If desired, the screw threads may be dispensed with and the end of the pressure connection or tube may be sweated or otherwise permanently united to the nipple.

In a preferred construction, which is useful even in situations wherein the instrument is exposed to high frequency vibrations, for instance, of the order of 2500 cycles per minute, the bellows has the least number of convolutions effective to produce the necessary amplitude of motion which, in a device of this type, may be very small, for example, of the order of a few one-thousandths of an inch. As shown (Fig. 3 and 6), only four convolutions are provided of which but three are active. The rigid left-hand head 42ª of the bellows has a smooth, vertical surface opposed to the switch-actuating pin 30 so that expansion of the bellows (producing motion of the head 42ª to the left, as viewed in Figs. 3 and 6) moves the pin 30, thereby to actuate the switch. Preferably, a light, coiled compression spring 47 is arranged within the bellows with its opposite ends bearing against the inner surfaces of the heads 47 and 47ª of the bellows, the spring adding to the normal tendency of the bellows to expand. However, this spring is not essential. The head 42 of the bellows is provided with a tube T of small diameter which may be connected to an air pump for evacuating the bellows, the tube T being permanently sealed off after the bellows has been evacuated.

With this arrangement the bellows will respond accurately to pressure changes in spite of vibrations of high frequency. The fidelity of response is obviously due in part to the reduction in the overall length of the bellows, since the small number of convolutions tends to minimize the possibility of resonance in response to impressed vibrations.

The aneroid type bellows 43 is of a beryllium alloy and, as is necessary in an absolute pressure instrument, should be evacuated to as high a degree as is practical in order to minimize the effects of temperature variations within the bellows. While an absolute vacuum is ideal, an actual vacuum of the order of 5 microns is about as high as is practical and insures an accuracy within acceptable limits. However, a degree of evacuation of less than 20 microns is to be considered as "high evacuation" as that term is here employed.

The alloy which, as the result of extended experiment, appears to give the best results is in major portion copper but contains from approximately 1.90 to 2.15% of beryllium, with nickel and/or cobalt constituting approximately 0.20% and containing iron in unavoidable inclusion to a minimum extent of 0.15%. The copper, beryllium and nickel and/or cobalt together constitute at least 99.50% of the alloy. A bellows of this material, made with a wall thickness of 0.00525 to 0.00575 inch, provides the requisite degree of responsiveness to variations in pressure within the range for which the instrument is designed. Such a bellows, properly evacuated and of an external diameter not exceeding one inch, and of a collapsed length not exceeding ½ inch, provides the necessary amount of motion for actuating a switch, of the above type, with a working pressure range of from 24 to 32 inches of mercury (absolute) without showing any tendency to become deformed or to take a permanent set under the severest conditions of use, and will withstand an internal pressure of 50 inches of mercury (absolute) for a substantial period (for instance, for 10 minutes or more) without injury or shift of its limits of motion. Furthermore, the thin walled bellows of beryllium (i. e., copper-beryllium alloy) shows no appreciable tendency to become permanently deformed under prolonged application of the operating load (within its elastic limit) and is elastically responsive to varying load in a substantially linear ratio within a wide range of loading. Thus, whereas, when using the usual brass or bronze bellows in a pressure control switch of the absolute type, it is necessary to make the bellows of large dimensions in order to obtain the necessary amount of motion without over-stressing of the metal, a bellows of beryllium alloy may be made of dimensions within the permissive limits imposed upon an absolute pressure switch for aeronautical use while still insuring long-life accuracy and sensitivity under all working conditions.

Figure 9:
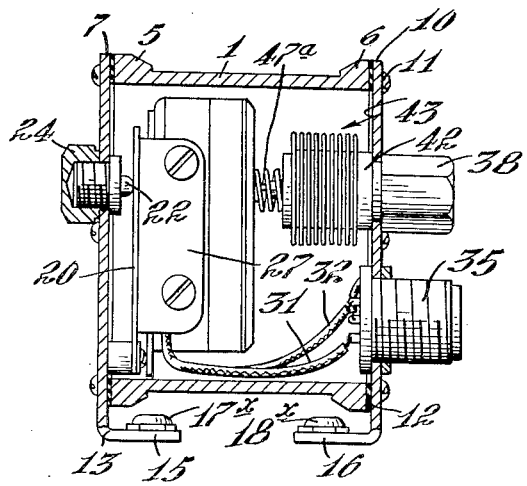
Fig. 9 is a vertical section through the case of the instrument illustrating a still further modification.

Constructions embodying slight modifications are illustrated in Figs. 7, 8 and 9. In the arrangements of Figs. 7 and 9, the bellows has more convolutions than the bellows of Figs. 3 and 6. The longer bellows provides a greater amplitude of movement of the movable head of the bellows and is thus desirable under certain conditions, but is not so accurate when the instrument is exposed to high frequency vibrations. In this arrangement (Figs. 7 and 3) the bellows has, for example, ten convolutions, nine of which are effective. The left-hand head 42$^b$ of the bellows is shaped (as shown in section in Fig. 8) to provide a reentrant cup-like portion having the side wall 43$^a$ and the inner or bottom wall 44. Within the cavity provided by the cup-like portion is arranged a motion-transmitting member, here shown as a short, rigid pin having a head 45 which engages the bottom wall 44 of the bellows head and which has a stem portion 46 of smaller diameter extending therefrom toward the switch-actuating pin 30 and in axial alignment with the latter. The head 45 is rigidly fixed to the wall 44 by welding or solder. A coiled spring (not shown) may be used in the arrangement of Fig. 7 (as in that of Figs. 3 and 6), or the spring may be omitted entirely, as shown in Fig. 8, or arranged externally, as shown in Fig. 9.

In the arrangement of Fig. 8 the bellows has but four convolutions, as in Figs. 3 and 6, but the motion of the movable head 42$^b$ of the bellows is transmitted to the switch-actuating pin 30 by the rigid member 45, 46.

In the construction shown in Figs. 7, 8 and 9, the casing heads are shaped to provide integral attaching bracket elements, thus the head 7 extends down below the lower wall 2 of the case and is bent at right angles at 13 to provide a strong, rigid attaching lug or foot 15. The front head 10 likewise extends down below the bottom wall 2 and is bent at right angles at 14 to provide the attaching foot 16, the feet 15 and 16 being in the same plane and being provided with plugs 17$^x$ and 18$^x$ which may be internally screw threaded for the reception of bolts or screws by means of which the device may be attached to a suitable support.

While certain desirable embodiments of the invention have been herein illustrated and described by way of example, it is to be understood that the invention is broadly inclusive of any and all modifications falling within the terms of the appended claims.

I claim:

1. A pressure control device for aeronautical use, said control device being of the absolute pressure type and useful in controlling a pressure motor designed to maintain a substantially constant predetermined pressure in a closed chamber, said control device, when in use, being located outside of said chamber and being externally exposed to varying atmospheric pressure, the control device being so constructed and arranged that it functions in the same manner regardless of its position and that its operation is unaffected by vibrations of the type to which it might be subjected if installed in an airplane, the control device comprising a rigid case of a size such that it may be installed in a space not substantially exceeding twenty-three cubic inches in volume and whose largest linear dimension does not exceed three inches, the case having attaching elements for mounting it on a support and comprising a hollow body portion open at each end and removable closures normally so attached to the opposite ends, respectively, of the body portion as, in combination with the body portion, to define an air-tight interior chamber, a snap action switch within said chamber, the switch having a movable actuating pin, a metallic bellows within the chamber, the bellows not substantially exceeding one inch in external diameter having one head which is rigidly attached to one of the end closures, the bellows being coaxial with the switch-actuating pin and having a movable head which is opposed to the pin, a holder for the switch comprising a stiffly resilient arm fixed at one end to the other end closure of the casing and which has a bias tending to move the switch bodily toward said last-named end closure and away from the bellows, and an adjustable stop carried by said last-named end closure operative to determine the distance of the switch holder from said end closure, said stop being accessible from the exterior of the casing.

2. A pressure control device according to claim 1, wherein the means for attaching the bellows to the end closure of the casing comprises a hollow stud fixed in an opening in said end closure, said stud being internally screw-threaded at its inner end, the fixed head of the bellows have a tubular nipple which engages the screw threads of the stud, and means providing a passage leading from the interior of the nipple to the space within the casing external to the bellows, the conduit which leads to the closed chamber being joined leak-tight to the outer end of the hollow stud and communicating with the interior of the stud.

3. A pressure control device of the absolute pressure type for controlling the pressure in the cabin of an aircraft, the weight of said control device not exceeding one pound, the device being of such external dimensions that it may be installed in a space not exceeding twenty-three cubic inches in volume and whose largest linear dimension does not exceed three inches, said device having a rigid air-tight case capable of withstanding external pressure at least as great as that of the atmosphere without substantial distortion, said case comprising a rigid, hollow body portion open at both ends and whose wall is thicker adjacent to each end than at its central portion, a rigid closure for each end of the body portion, a resilient gasket interposed between each closure and the adjacent end of the body portion, fastener means removably securing each respective closure to the thickened end portion of the casing wall, an elongate spring arm rigidly secured at one end in spaced relation to the inner surface of one of said closures, the free end of the spring arm normally tending to flex toward said inner surface, an adjusting screw passing through said last-named closure and which is operative to limit deflection of the spring arm toward said closure, a snap-action electric switch having an actuating pin, said switch being mounted on said arm with its actuating pin directed toward the other closure, a single chamber metallic bellows within the casing, said bellows having spaced heads connected by a corrugated wall of beryllium copper having not more than three active convolutions, thereby to minimize the effect of external vibrations to which the device may be exposed during use, means fixing one of said heads to the closure which is remote from the switch, the other head of the bellows being opposed to and in operative relation to the switch pin, the bellows not exceeding one inch in external diameter and being evacuated to twenty microns or less, and being of a collapsed length not exceeding one-half inch, the material of the bellows being of a stiffness and resiliency such as to provide the requisite force for actuating the switch pin when the bellows is free to expand, and to withstand an internal pressure of fifty mm. of mercury for a period of the order of ten minutes without suffering permanent distortion, the means for securing the fixed head of the bellows to the casing closure comprising a hollow stud fixed leak-tight in an opening in said closure and having internal screw threads at its inner end, the fixed head of the bellows having a threaded nipple engaging the screw threads in the stud, thereby providing anchorage for the fixed head of the bellows, said nipple having therein a passage which communicates at its outer end with the interior of the stud and at its inner end with the space within the casing which is external to the bellows, means whereby a pipe communicating with the cabin may be attached to the outer end of the stud, and means providing for the passage, air-tight, of insulated electrical conductors through one of the casing closures.

4. A pressure control device according to claim 3, wherein the movable head of the bellows has a surface perpendicular to the axis of the switch-actuating pin, and which contacts the outer end of the pin when the bellows expands to a predetermined amount, the bellows being inherently capable of expanding and contracting in a substantially straight line ratio in response to variation in external pressure to which the bellows may be subjected, the corrugated side wall of the bellows being wholly of copper beryllium alloy containing from approximately 1.090 to 2.15 percent of beryllium, said side wall being of a thickness of from 0.00525 to 0.00575 inch.

5. A pressure control device according to claim 1 further characterized in that a compression spring is arranged within the bellows with its opposite ends bearing against the inner surface of the respective heads of the bellows thereby tending to expand the bellows.

6. A pressure control device according to claim 1 further characterized in that the movable head of the bellows is shaped to provide a re-entrant portion forming a cup-like cavity and a rigid pin having a head which is arranged within said cavity and contacts the bottom wall of the cavity, the pin having a shank portion which extends outwardly beyond the bellows and which is axially aligned with the switch actuating pin.

7. A pressure control device according to claim 1 further characterized in having a rigid, motion-transmitting element interposed between the movable head of the bellows and the switch actuating pin, and a compression spring bearing at one end against the switch and at its opposite end against the movable head of the bellows.

References Cited in the file of this patent

UNITED STATES PATENTS

| | | |
|---|---|---|
| 1,920,764 | Nickle | Aug. 1, 1933 |
| 1,948,339 | Doeg | Feb. 20, 1934 |
| 2,033,417 | Dezotell | Mar. 10, 1936 |
| 2,094,319 | Faust | Sept. 28, 1937 |
| 2,162,308 | Jenny | June 13, 1939 |
| 2,177,480 | Gaynor | Oct. 24, 1939 |
| 2,302,923 | Zimarik | Nov. 24, 1942 |
| 2,366,897 | Grooms | Jan. 9, 1945 |
| 2,395,007 | Leupold | Feb. 19, 1946 |
| 2,411,577 | Leslie | Nov. 26, 1946 |
| 2,432,312 | Hasselhorn | Dec. 9, 1947 |
| 2,532,448 | Hasselhorn | Dec. 5, 1950 |
| 2,549,690 | Klemperer | Apr. 17, 1951 |
| 2,554,659 | Branson | May 29, 1951 |
| 2,562,385 | Marcellus | July 31, 1951 |
| 2,603,728 | Melchior | July 15, 1952 |
| 2,648,741 | Starbird | Aug. 11, 1953 |